United States Patent Office 3,829,383
Patented Aug. 13, 1974

---

3,829,383
DETERGENT BUILDER AND SEQUESTERING AGENT
Gene C. Robinson, Baton Rouge, La., assignor to Ethyl Corporation, Richmond, Va.
No Drawing. Continuation-in-part of application Ser. No. 262,547, June 14, 1972, which is a continuation-in-part of application Ser. No. 232,638, Mar. 7, 1972, both now abandoned. This application Dec. 11, 1972, Ser. No. 313,863
Int. Cl. C11d 3/20
U.S. Cl. 252—89
17 Claims

ABSTRACT OF THE DISCLOSURE

To obviate eutrophication of lakes, streams, etc., non-phosphorus highly biodegradable builders and sequestrants are provided for household and industrial use. These builders and sequestrants are either (1) a cis-2,5-disubstituted tetrahydrofuran in which the substituents are carboxy or carboxymethyl groups, (2) water soluble salts of such tetrahydrofurans, or (3) mixtures of (1) and (2). Conventional detergent actives may also be utilized in combination with the builders or sequestrants of this invention.

CROSS REFERENCE TO RELATED APPLICATION

This application is a continuation-in-part of my copending applications Ser. No. 262,547, filed June 14, 1972 and Ser. No. 232,638, filed Mar. 7, 1972, both now abandoned. Ser. No. 262,547 is a continuation-in-part of Ser. No. 232,638.

BACKGROUND OF THE INVENTION

Organic compounds having the ability to sequester metallic ions, e.g., calcium and magnesium ions in aqueous media have many valuable applications. For example, these organic compounds may be utilized in food processing to sequester various metal ions found in the product which are detrimental to flavor, stability, etc., or they may be used in various detergent formulations to build such formulations and, therefore, increase the formulations cleaning effectiveness. This latter application is probably the largest application of such organic compounds, at least in terms of pounds consumed per year. Presently, among the most effective builders are the polyphosphates, notably sodium tripolyphosphate and tetra sodium pyrophosphate. Despite the utility of these compounds, distinct disadvantages arise from their use—most notably they are alleged to contribute significantly to the eutrophication of rivers, lakes, underground streams and other bodies of water due to the phosphorus content of the compounds. ["Detergent Phosphorus Effect on Aglae" by Thomas E. Maloney, Journal of the Water Pollution Control Federation, vol. 38, No. 1, pp. 38–45 (January 1966).]

It is, therefore, an object of this invention to provide phosphorus-free, highly biodegradable organic compounds which do not suffer from the foregoing mentioned eutrophication problems and which, in aqueous media, are highly effective sequestrants and which, when used in detergent formulations, enhance the cleaning effectiveness thereof.

Other important objects of this invention will become apparent from the ensuing description and appended claims.

THE INVENTION

In accordance with one embodiment of this invention it has been found possible to reduce—indeed eliminate—the use of phosphorus-containing sequestrants in aqueous media without a significant sacrifice of sequestering capability by employing as a sequestrant in the aqueous media (a) a cis-2,5-disubstituted tetrahydrofuran,
(b) a water soluble salt of a cis-2,5-disubstituted tetrahydrofuran, or
(c) any mixture of (a) and (b)

in which the substituents are carboxy groups, carboxymethyl groups or mixtures thereof. The cis-2,5-disubstituted tetrahydrofurans of this invention have the formula:

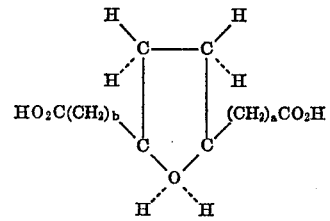

wherein "a" is either one or zero and "b" is either one or zero. A preferred tetrahydrofuran having the above formula is cis-2,5-dicarboxy tetrahydrofuran. Other such tetrahydrofurans which are suitable for the purposes of this invention are cis-2,5-carboxy-5-carboxymethyl tetrahydrofuran and cis-2,5-dicarboxymethyl tetrahydrofuran.

As before mentioned, the water soluble salts of cis-2,5-disubstituted tetrahydrofuran in which the substituents are carboxy groups, carboxymethyl groups or mixtures thereof are also very useful as sequestrants.

The preferred water soluble salts are mono and di alkali salts although the dipotassium and disodium salts are most preferred. A most highly preferred alkali metal salt is the disodium salt of cis-2,5-dicarboxy tetrahydrofuran. Non-alkali metal salts are also useful for the purposes of this invention, especially the ammonium salts, the alkyl ammonium salts, the morpholinium salts and the alkanol ammonium salts. Examples of various water soluble salts of the above mentioned tetrahydrofurans which are useful for the purposes of this invention are: the disodium salts, the monolithium salts, the diammonium salts, the normal monoethanolamine salts, the dipotassium salts, the normal monoisopropanolamine salts, the sodium potassium salts, the normal morpholine salts, the normal monoethanolamine monosodium salts, the monoethylammonium salts, the monosodium salts and the like. It is to be understood that the tetrahydrofuran salts of this invention may be used either singularly or in combination with each other, e.g. the disodium salts and the diammonium salts may be utilized in combination.

As sequestrants, the concentration of the above described compounds in any given aqueous solution will, of course, be dependent to some extent upon (1) the concentration of the substance to be sequestered and (2) the amount of the substance which is desired to be sequestered whether that amount be all or part of the substance which is present. Thus amounts ranging from trace quantities up to about 10,000 p.p.m. or more are permissible.

The sequestrants of this invention are especially effective in aqueous systems having a pH of about 10. However, it is to be understood that these compounds are also effective in systems which are less basic, i.e. systems having a pH down to about 7 and also in systems which are more basic, i.e. systems having a pH up to about 12.

Generally speaking, the sequestrants of this invention will be used to sequester metallic ions in aqueous media, such ions so sequestered will be in great part calcium and/or magnesium as these are the metallic ions which are most prevalent in ordinary "tap" water. The salts which are most responsible for the presence of these metallic ions are calcium sulfate, calcium carbonate, magnesium carbonate, magnesium sulfate, calcium chloride, magnesium chloride, calcium nitrate, magnesium nitrate, calcium bicarbonate, magnesium bicarbonate, and the like. Other metal ions such as the ions of iron, manganese, copper, aluminum, chromium, nickel, cobalt, tin and vanadium may also be present in "tap" water and are also sequestered by the sequestrants of this invention. In special cases the various ions to be sequestered may be of different proportions than that found in "tap" water and thus it is to be understood that the sequestrants of this invention are equally efficacious in these special aqueous systems.

The above described sequestrants can be advantageously used in aqueous systems for many purposes, e.g., as water softeners, as trace metal deactivators enhancing oxidative stability, for medical purposes in binding toxic metal ions, and, as before said, as constituents in detergent formulations.

Not only are the forementioned acids, salts and mixtures thereof effective sequestrants in aqueous media, but also they have been found to be highly effective builders when used in detergent formulations. When used as a constituent in detergent formulations, the above described acid salts and mixtures thereof enhance the cleaning effectiveness of the formulations in aqueous washing systems. In other words, these compounds act to build the formulation—they serve the various functions of a detergent builder. Examplary of such functions are decreasing the redisposition of soil from the detergent bath on to the substrate, sequestering heavy metal ions to prevent precipitation of surface-active compounds used in the detergent formulations, promoting foaming power and foam stability increasing the whiteness and/or the optical appearance of cleanliness, increasing the solubility or otherwise modifying the physical form of the detergent composition and inhibiting injurious effects which the detergent formulation in the aqueous system may have on the substrate. Therefore, another embodiment of this invention is the utilization of a cis-2,5-disubstituted tetrahydrofuran in which the substituents are carboxy groups, carboxy methyl groups or mixtures thereof, a water soluble salt of such cis-2,5-disubstituted tetrahydrofurans, or any mixture of the acid and the salt as builders in detergent formulation. Besides being such effective builders, the above described acids, salts and mixtures thereof, exhibit outstanding and surprising aerobic ultimate biodegradable characteristics. It was found that in a standard test for aerobic biodegradability using bacteria from everyday sewage, the compounds of this invention biodegrade to 95 percent of the theoretical amount of formable $CO_2$ and $H_2O$ present in the compounds. This degree of biodegradability was observed after 30 days contact with the bacteria. This amount of aerobic biodegradability in such a short period of time is most surprising when it is noted that tetracarboxytetrahydrofuran, a compound having a structure similar to the compounds of this invention, biodegrades to only 2 percent of the theoretical amount of formable $CO_2$ and $H_2O$ present in the tetracarboxytetrahydrofuran when subjected to the above test for 30 days. Besides this highly desirable biodegradable feature, the builders of this invention provide to the detergent manufacturer, a builder which contains no phosphorus and therefore presents no threat to the eutrophication of streams, lakes, etc.

In a detergent formulation, the builders of this invention are readily employed with a wide variety of detergents, including those classed in the art as anionic detergents, cationic detergents, nonionic detergents and ampholytic (i.e., amphoteric) detergents and zwitterionic detergents and any suitable mixture of two or more of these (whether from the same class or from different classes). Those skilled in the art are thoroughly familiar with the nature of such detergent compounds and the literature is replete with illustrations and exemplifications. Typical of the literature which may be consulted in this regard are "Surface Active Agents" by Schwartz and Perry and "Surface Active Agents and Detergents" by Schwartz, Perry and Berch, the disclosure of the foregoing being incorporated herein by reference.

The anionic surface-active compounds (which are preferred surfactants) are generally described as compounds which contain hydrophilic and lyophilic groups in their molecular structure and which ionize in an aqueous medium to give anions containing the lyophilic group. Typical of these compounds are the alkali metal salts of organic sulfonates or sulfates, such as the alkali metal alkyl aryl sulfonates and the alkali metal salts of sulfates of straight chain primary alcohols. Sodium dodecylbenzene sulfonate and sodium lauryl sulfate are typical examples of these anionic surface-active compounds (anionic synthetic detergents). For a further exemplification of anionic organic detergents which can be successfully built in accordance with this invention, reference should be had to U.S. Pat. No. 3,422,021, particularly the passage extending from column 11, line 47 through coloumn 12, line 15, including the references therein cited. Inasmuch as the anionic organic detergents described therein can be successfully built in accordance with this invention the foregoing passage is incorporated herein as if fully set out in this specification.

The cationic detergents are those which ionize in an aqueous medium to give cations containing the lyophilic group. Typical of these compounds are the quaternary ammonium salts which contain an alkyl group of about 12 to about 18 carbon atoms, such as lauryl benzyl dimethyl ammonium chloride. Compounds of this nature are used in detergent formulations for special purposes, e.g., sanitizing and fabric softening.

Nonionic surface-active compounds are generally described as compounds which do not ionize in water solution. Oftentimes these possess hydrophilic characteristics by virtue of the presence therein of an oxygenated chain (e.g., a polyoxyethylene chain), the lyophilic portion of the molecule being derived from fatty acids, phenols, alcohols, amides or amines. Exemplary materials are the poly-(ethylene oxide) and condensates of alkyl phenols (e.g., the condensation product formed from one mole of nonyl phenol and ten moles of ethylene oxide), and the condensation products of aliphatic alcohols and ethylene oxide (e.g., the condensation product formed from 1 mole of tridecanol and 12 moles of ethylene oxide). Reference should be had to U.S. Pat. No. 3,422,021, especially the passage extending from column 12 line 16 through column 13, line 26 where a fairly extensive discussion and exemplification of nonionic synthetic detergents is set forth. Inasmuch as the nonionic synthetic detergents set forth in that passage can be successfully built in accordance with this invention, the foregoing passage is incorporated herein as if fully set out in this specification.

The ampholytic surfactants are compounds having both anionic and cationic groups in the same molecule. Exemplary of such materials are derivatives of aliphatic amines which contain a long chain of about 8 to about 18 carbon atoms and an anionic water solubilizing group, e.g. carboxysulfo, sulfo or sulfato. Examples of ampholytic detergents are sodium-3-dodecylaminopropionate, sodium-3-dodecylaminopropane sulfonate, sodium N-methyl taurate, and related substances such as higher alkyl disubstituted amino acids, betaines, thetines, sulfated long chain olefinic amines, and sulfated imidazoline derivatives.

Zwitterionic synthetic detergents are generally regarded as derivatives of aliphatic quaternary ammonium compounds, in which the aliphatic radical may be straight chain or branched and wherein one of the aliphatic substituents contains from about 8 to about 18 carbon atoms and one contains an anionic water solubilizing group, e.g., carboxy, sulfo, or sulfato. Examples of compounds falling within this definition are 3-(N,N-dimethyl-N-hexadecyl-ammonio)-propane-1-sulfonate and 3-(N,N-dimethyl-N-hexadecyl-ammonio)-2-hydroxypropane-1-sulfonate. For a still further appreciation of surface-active compounds (synthetic detergents) which can be employed in the practice of this invention reference may be had, for example, to the disclosures of U.S. Pat. 2,961,409 and French Pat. 1,398,753.

As before noted the anionic detergent surfactants are preferred and thus their use with the builders of this invention will yield a preferred detergent formulation.

For further disclosure of the surfactant art in general see U.S. 3,526,592 and the various U.S. patents referred to therein. Inasmuch as the surfactants set forth in these above patents are compatible with this disclosure, the foregoing patents are incorporated herein as if fully set out in the specification.

The detergent formulations may also contain from about 2 to about 10 percent by weight, based on the total weight of the formulation, a water soluble alkali metal silicate. Soluble silicates of such alkali metals as sodium and potassium serve as effective corrosion inhibitors and thus their presence yields a preferred detergent formulation. When utilizing the water-soluble alkali metal silicate, it is desirable to employ one or more silicates of sodium or potassium, or both, wherein the weight ratio of $SiO_2:M_2O$ (M=Na or K) is in the range of from about 1:1 to about 2.8:1. Sodium silicates wherein this ratio is in the range of about 1.6:1 to about 2.5:1 are especially useful because of their low cost and effectiveness.

Other preferred constituents for the detergent formulations are alkali metal sulfates. preferably sodium sulfate or an alkali metal carbonate, preferably sodium carbonate or both. Amounts up to about 60 percent by weight of the total formulation are suitable. These formulations are effective, economical mainstays of finished detergent formulations for laundry, household and/or industrial use. In the preferred formulation the amount of alkali metal sulfate and/or alkali metal carbonate is generally from about 10 to about 50 percent by weight based on the total weight of the formulation.

Of course, the detergent formulations may also contain minor amounts of other commonly used materials in order to enhance the effectiveness or attractiveness of the product. Exemplary of such materials are soluble sodium carboxymethyl cellulose or other soil redeposition inhibitors; benzotriazole, ethylene thiourea, or other tarnish inhibitors; perfume; fluorescers; dyes or pigments; brightening agents; enzymes; water; alcohols; other builder additives, such as sodium tripolyphosphate and/or the water-soluble salts of ethylenediamine-tetraacetic acid, N-(2-hydroxyethyl)-ethylenediaminetriacetic acid, nitrilotriacetic acid and N-(2-hydroxyethyl)-nitrilodiacetic acid; and pH adjusters, such as sodium hydroxide and potassium hydroxide. In built liquid detergent formulations, the use of hydrotropic agents may be found efficacious. Suitable hydrotropes include the water-soluble alkali metal salts of toluene sulfonic acid, benzene sulfonic acid, and xylene sulfonic acid. Potassium toluene sulfonate and sodium toluene sulfonate are preferred for this use and will normally be employed in concentrates ranging up to about 10 or 12 percent by weight based on the total composition. The foregoing described detergent formulations may be of any of the various commercially desirable forms. For example, the formulations of this invention may be provided in granular form, in liquid form, in tablet form, or in the form of flakes or powders.

The relative proportions and absolute quantities of the several ingredients of the detergent formulations described above are susceptible to variations and in most cases will vary depending on such factors as the nature of the particular ingredients being utilized, the use for which the compound is intended to be put or the relative cost of the ingredient, and the like. For example, the total concentration of the detergent formulations in water will normally range below about 0.3 percent by weight although it is entirely feasible to utilize higher concentrations where the circumstances warrant or justify the use of higher concentrations. In most cases the aqueous washing solutions will contain from about 0.05 to about 0.25 weight percent of combined detergent active(s) and builder. When employing the builder compound(s) in detergent formulations, the weight ratio of detergent active(s) to the compound(s) should be about 1:10 to about 10:1. The preferred ratios are within the range of about 1:8 to about 2.5:1. The most preferred range is from about 1:5 to about 2:1. In some instances it may be desirable to utilize, even though the builders of this invention are phosphorus free, reduced quantities of conventional phosphorus-containing materials in the detergent formulation. Examples of such phosphorus-containing materials are sodium tripolyphosphate, tetra sodium pyrophosphate, salts of substituted methylene diphosphonic acid long chain tertiary phosphine oxides, and the like.

Detergent formulations containing a builder of this invention may be used in aqueous systems having a wide pH range. When it is desired to operate a system having a high pH (about 9–12), the builder salts may be used in the formulation as they render the solution basic. On the other hand when operating under acidic conditions (pH below about 6), the acidic form of the builder may be used. Of course, when it is desired to operate within an intermediate range (pH of about 7), the acid and the salt may be both utilized. Another mode involves using the acid or the salt and subsequently adjusting the pH of the system by adding base or acid respectively. For example, a system having a high pH can be obtained by using the acid form of the builder and then adding a sufficient quantity of base to achieve the desired pH. It has been found that the best building action takes place at a pH of about 10. However, the builders of this invention are still very effective in essentially neutral systems.

Manufacture of the compounds of this invention is well documented. See for example, A. C. Cope and W. N. Baxter, J. Am. Chem. Soc., 77, 393 (1955), W. H. Haworth, W. G. M. Jones, and L. F. Wiggins, J. Chem. Soc., 1(1945), and H. R. LeSueur and P. Haas, J. Chem. Soc., 97, 173 (1910). For example, in the hydrogenation described in Cope and Baxter cis-2,5-dicarboxy tetrahydrofuran, cis-2-carboxy-5-carboxymethyl tetrahydrofuran and cis-2,5-dicarboxymethyl tetrahydrofuran can be produced by hydrogenating dimethyl furan-2,5-dicarboxylate, dimethyl ester of furan-2,5-diacetic acid and dimethyl ester of 5-carboxymethyl-2-furoic acid respectively. The last two reactants may be prepared by the respective esterification of furan-2,5-diacetic acid and 5-carboxymethyl-2-furoic acid. Esterification can be carried out by reacting these acids with an excess of methanol in the presence of a sulfuric acid catalyst. See K. Yu. Novitshi et al., Zh. Obsch. Khim., 32, 3308 (1962); C. A. 58, 11301 H (1963) for the preparation of furan-2,5-diacetic acid and N. N. Schmagina and P. A. Moshkin, Plasticheskie Massy, 58 (1965); C. A., 62, 16168 e (1965) for the preparation of 5-carboxymethyl-2-furoic acid. The presence of the trans isomer of the compounds of this invention in the final product is of little concern as these trans isomers may be present in the detergent formulations and aqueous systems of this invention.

In order to still further illustrate the practice of this invention, the following non-limiting examples are presented.

EXAMPLE I

Seven grains of calcium (calculated as calcium carbonate) were added to each of three 1-gallon samples of water. To the resulting solutions the disodium salt of cis-2,5-dicarboxy tetrahydrofuran was added so as to prepare a 0.06 percent solution, a 0.03 percent solution and a 0.02 percent solution. The pH was adjusted to 10 in each sample by the addition of caustic or acid as was needed to obtain the desired pH. The residual calcium was then measured separately in all of the samples using a standardized calcium electrode. It was found that; 6.9 grains of calcium were sequestered in the 0.06 percent solution, that 6.5 grains of calcium were sequestered in the 0.03 percent solution and 4.4 grains of calcium were sequestered in the 0.02 percent solution.

For the purposes of comparison the following example was run which clearly indicated that the compounds of this invention are essentially comparable to one of the most often used phosphate-containing sequestrants, i.e. sodium tripolyphosphate.

EXAMPLE II

The procedure of Example I was followed except that sodium tripolyphosphate was utilized as the sequestrant. It was found that; 6.9 grains of calcium were sequestered in the 0.06 percent solution, that 6.5 grains of calcium were sequestered in the 0.03 percent solution and that 5.4 grains of calcium were sequestered in the 0.02 percent solution.

EXAMPLE III

A preferred built formulation of this invention had the following composition:

| | Weight percent |
|---|---|
| Dodecylbenzene sulfonate (a typical linear alkyl benzene sulfonate) | 20.0 |
| Sodium silicate (ratio $SiO_2:Na_2O$ of 2.4:1) | 6.0 |
| Sodium carboxymethyl cellulose | 1.0 |
| Sodium sulfate | 29.1 |
| Disodium salt of cis-2,5-dicarboxy tetrahydrofuran | 35.0 |
| Water | 8.9 |

The performance of this detergent composition was evaluated by use of the standard Launder-Ometer test. In particular, the formulation was dissolved in water to a concentration of 0.15 weight percent and the pH of the solution adjusted to 9.5 with small amounts of sodium hydroxide solution. The water had a hardness of 150 p.p.m. (Ca/Mg 3/2). Swatches of standard artificially soiled cloth were subjected to the washing procedure. The Launder-Ometer bath temperature was fixed at 120° F. and the washing span was 10 minutes. After washing, the samples were removed from the washing solution and thoroughly rinsed with pure water. After drying, the whiteness of the cloths was ascertained by use of a standard commercially available reflectance photometer. The identical procedure also was employed with a formulation identical to that described above with the exception that sodium tripolyphosphate was used in lieu of the disodium salt of cis-2,5-dicarboxy tetrahydrofuran.

In these tests it was established that the formulation of this invention was at least as effective as the corresponding sodium tripolyphosphate formulation. In particular, the cloths washed with the formulation of this invention had a whiteness of 101 as compared to the whiteness of the same kind of soiled cloths washed in the sodium tripolyphosphate formulation (assigned the value of 100 percent).

EXAMPLE IV

Example III was repeated except that the water hardness was increased to 300 p.p.m. The results showed that the formulation of this invention had a whiteness of 94 as compared to the whiteness of the same kind of soiled cloth washed in the sodium tripolyphosphate formulation which rated a whiteness of 95.

Some illustrative solid heavy duty laundering formulations of this invention are as follows (percentages being by weight percentages):

| | Percent |
|---|---|
| Surface-active agent [1] | 10–25 |
| Disodium salt of cis-2-carboxy-5-carboxymethyl tetrahydrofuran [2] | 10–25 |
| Sodium metasilicate (anhydrous) | 2–10 |
| Sodium carboxymethyl cellulose | 1 |
| Optical brightener (fluorescent dye) | 0.1 |
| Perfume | 0.1 |
| Sodium sulfate,[3] balance to 100%. | |

[1] One or a combination of the following: sodium alkyl aryl sulfonate, sodium alkyl sulfonate, sodium alkane sulfonate, sodium alkenyl sulfonate, octyl phenol ethoxylate, nonyl phenol ethoxylate, fatty alcohol ethoxylate, fatty acid amide, alkanol amide, tall oil ethoxylate.
[2] The disodium salt of cis-2-carboxy-5-carboxymethyl tetrahydrofuran may be totally or partially replaced by the dipotassium salt.
[3] The sodium sulfate may be totally or partially replaced by one or more of the following: borax, soda ash, sodium bicarbonate, sodium chloride, sodium sesquicarbonate.

Typical liquid laundering formulations of this invention are as follows (percentages being weight percentages):

| | Percent |
|---|---|
| Surface-active agent [1] | 10–15 |
| Dimorpholinium salt of cis-2,5-dicarboxymethyl tetrahydrofuran | 10–20 |
| Potassium metasilicate | 2–10 |
| Sodium carboxymethyl cellulose | 1 |
| Sodium benzene sulfonate [2] | 5–10 |
| Optical brightener (fluorescent dye) | 0.1 |
| Water, balance to 100%. | |

[1] Same as footnote 1, supra.
[2] The sodium benzene sulfonate may be totally or partially replaced by potassium benzene sulfonate, sodium toluene sulfonate, sodium xylene sulfonate, etc.

This invention is not limited to any particular method of mixing the builder and the detergent. The builder may be mechanically mixed in, crutched in the detergent in the form of a slurry, or dissolved in a solution of the detergent formulation. In addition, the builder system may be admixed with the detergent formulation in any of the forms in which the detergent formulation is manufactured, as well as being added simultaneously or separately to an aqueous solution. In any event, the present builder system is intended to be used with the detergent formulation at the time of application as a cleansing agent.

The detergent formulations of this invention have utility in many cleansing operations. For example, they may be used in the cleaning of a non-rigid substrate such as cloth or in washing of rigid substrate such as dishes, floors, or automobile bodies. Other utilizations of the detergent formulations of this invention will become immediately apparent to those skilled in the art.

As noted above, the builders and sequestrants of this invention may be used in combination with other builders or sequestrants. Such combinations offer the opportunity for enhanced cost effectiveness or superior results, or both. Among the builders or sequestrants which may be combined with those of this invention are the water soluble salts of such acids as citric acid (e.g., trisodium citrate, tripotassium citrate, etc.), diglycolic acid (e.g., disodium diglycolate, dipotassium diglycolate, etc.), nitrilotriacetic acid (e.g., trisodium nitrilotriacetate, tripotassium nitrilotriacetate, etc.), oxydisuccinic acid (e.g., tetrasodium oxydisuccinate, tetrapotassium oxydisuccinate, etc.), and the like, as well as mixtures of two or more of such salts. If desired, the free acids (e.g., citric acid, diglycolic acid, nitrilotriacetic acid, oxydisuccinic acid or mixtures of two or more of these acids) may be used in combination with the builders or sequestrants of this invention. Combinations in which there is no nitrogen or phosphorus-containing ingredient are particularly preferred from the ecological standpoint. When using such combinations the ratios of the builders or sequestrants may be varied within relatively wide limits although generally speaking the weight ratio between the builder of this invention and the builder used therewith will fall within the range of from about 0.01:1 to about 10:1, and most preferably from about 0.25:1 to about 4:1.

The preferred builders of this invention are the alkali metal salts of the above described cis-2,5-disubstituted tetrahydrofurans. Of these preferred salts the sodium, the potassium and the potassium-sodium salts are most preferred. A most highly preferred builder of this invention is the disodium salt of cis-2,5-dicarboxy tetrahydrofuran. As is the case when the compounds of this invention are utilized as sequestrants, mixtures of the salts may be utilized.

Of the acidic forms of the builders of this invention cis-2,5-dicarboxy tetrahydrofuran is the most preferred.

It is not intended that this invention be unduly limited by the exemplifications herein provided.

I claim:

1. A detergent formulation consisting essentially of an organic detergent surfactant suitable for use in water, selected from the group consisting of anionic detergents, cationic detergents, nonionic detergents, ampholytic detergents, zwitterionic detergents and mixtures thereof, and as a builder, a compound selected from the group consisting of
   (a) a cis-2,5-disubstituted tetrahydrofuran in which the substituents are carboxy groups or carboxymethyl groups,
   (b) a water soluble alkali metal, ammonium, lower alkyl ammonium, morpholinium or lower alkanol ammonium salt of said cis-2,5-disubstituted tetrahydrofuran, and
   (c) any mixture of (a) and (b),
the ratio by weight of the detergent surfactant to said compound being in the range of from about 10:1 to about 1:10.

2. A detergent formulation consisting essentially of an organic detergent surfactant suitable for use in water selected from the group consisting of anionic detergents, cationic detergents, nonionic detergents, ampholytic detergents, zwitterionic detergents, and mixtures thereof and a water soluble alkali metal, ammonium, lower alkyl ammonium, morpholinium or lower alkanol ammonium salt of a cis-2,5-disubstituted tetrahydrofuran in which the substituents are carboxy groups or carboxymethyl groups, the ratio by weight of the detergent surfactant to the water soluble salt being in the range of about 10:1 to about 1:10.

3. The formulation of Claim 2 wherein the water soluble salt is an alkali metal salt.

4. The formulation of Claim 2 wherein the water soluble salt is a sodium salt, a potassium salt, a potassium-sodium salt, or a mixture thereof.

5. The formulation of Claim 2 wherein the water soluble salt is the disodium salt of cis-2,5-dicarboxy tetrahydrofuran.

6. The formulation of Claim 2 wherein the ratio by weight of the detergent surfactant to the water soluble salt is from about 1:5 to about 2:1.

7. The formulation of Claim 2 wherein said detergent surfactant is one or a mixture of anionic detergents.

8. A formulation in accordance with Claim 2 which contains a water soluble alkali metal silicate present in an amount of from about 2 to about 10 percent by weight based on the total weight of the formulation.

9. A formulation in accordance with Claim 2 which contains an alkali metal sulfate or an alkali metal carbonate, or both present in an amount of up to about 60 percent by weight based on the total weight of the formulation.

10. A formulation in accordance with Claim 2 wherein said detergent surfactant is one or a mixture of anionic detergents, wherein said water soluble salt is the disodium salt of cis-2,5-dicarboxytetrahydrofuran, and which contains from about 2 to about 10 percent by weight, based on the total weight of the formulation, of a water soluble sodium silicate and up to about 60 percent by weight, based on the total weight of the formulation, of sodium sulfate.

11. An aqueous washing system consisting essentially of an organic detergent surfactant selected from the group consisting of anionic detergents, cationic detergents, nonionic detergents, ampholytic detergents, zwitterionic detergents and mixtures thereof, and as a builder, a compound selected from the group consisting of
   (a) a cis-2,5-disubstituted tetrahydrofuran in which the substituents are carboxy groups or carboxymethyl groups,
   (b) a water soluble alkali metal, ammonium, lower alkyl ammonium, morpholinium or lower alkanol ammonium salt of said cis-2,5-disubstituted tetrahydrofuran, and
   (c) any mixture of (a) and (b),
the ratio by weight of said detergent surfactant to said water soluble salt being within the range of from about 1:10 to about 10:1 and wherein said system has a pH above 7.

12. An aqueous washing system consisting essentially of water, an organic detergent surfactant selected from the group consisting of anionic detergents, cationic detergents, nonionic detergents, ampholytic detergents, zwitterionic detergents, and mixtures thereof, and a water soluble alkali metal, ammonium, lower alkyl ammonium, morpholinium or lower alkanol ammonium salt of a cis-2,5-disubstituted tetrahydrofuran in which the substituents are carboxy groups or carboxymethyl groups, the ratio by weight of said detergent surfactant to said water soluble salt being within the range of from about 1:10 to about 10:1, and wherein said system has a pH above 7.

13. The system of Claim 12 wherein the ratio by weight of the detergent surfactant to the water soluble salt is from about 1:5 to about 2:1.

14. The system of Claim 12 wherein the pH is about 10.

15. The system of Claim 12 wherein said detergent surfactant is one or a mixture of anionic detergents.

16. The system of Claim 12 wherein said water soluble salt is the disodium salt of cis-2,5-dicarboxy tetrahydrofuran.

17. The method of washing articles which comprises contacting the same with the aqueous washing system of Claim 12.

References Cited

UNITED STATES PATENTS

| | | | |
|---|---|---|---|
| 3,580,852 | 5/1971 | Yang | 252—135 |
| 3,699,684 | 9/1972 | Hentschel | 252—Dig. 11 |
| 3,635,830 | 1/1972 | Lamberti | 252—89 |

FOREIGN PATENTS 853,647  10/1970  Canada.

OTHER REFERENCES

Journal of American Chem. Soc. 77, p. 393, 1955.
Journal of Chem. Soc. 1, 1945.
Journal of Chem. Soc. 97, p. 173, 1910.

LEON D. ROSDOL, Primary Examiner
E. L. ROLLINS, Assistant Examiner

U.S. Cl. X.R.

252—180, 525, Dig. 11